US011468632B2

(12) United States Patent
McPeek et al.

(10) Patent No.: US 11,468,632 B2
(45) Date of Patent: Oct. 11, 2022

(54) AGRICULTURAL MODELING SYSTEM WITH DATA FUSION AND RELATED SERVER COMPUTING RESOURCE AND METHODS

(71) Applicant: AGERPOINT, INC, New Smyrna Beach, FL (US)

(72) Inventors: K. Thomas McPeek, New Smyrna Beach, FL (US); Karl Steddom, New Smyrna Beach, FL (US); Pengfei Xuan, New Smyrna Beach, FL (US); Hemanth Kalluri, New Smyrna Beach, FL (US); Chima Obi, New Smyrna Beach, FL (US); Paras Pant, New Smyrna Beach, FL (US); Angela Kim, New Smyrna Beach, FL (US)

(73) Assignee: AGERPOINT, INC., Durham, NC (US)

( * ) Notice: Subject to any disclaimer, the term of this patent is extended or adjusted under 35 U.S.C. 154(b) by 0 days.

(21) Appl. No.: 17/114,630

(22) Filed: Dec. 8, 2020

(65) Prior Publication Data

US 2022/0180599 A1 Jun. 9, 2022

(51) Int. Cl.
*G06T 17/05* (2011.01)
*G01S 17/89* (2020.01)
*H04L 67/01* (2022.01)

(52) U.S. Cl.
CPC .............. *G06T 17/05* (2013.01); *G01S 17/89* (2013.01); *H04L 67/01* (2022.05);
(Continued)

(58) Field of Classification Search
CPC . G06T 17/05; G06T 2200/08; G06T 2210/56; G06T 2215/12; G06T 2215/16; G01S 17/89; H04L 67/42
See application file for complete search history.

(56) References Cited

U.S. PATENT DOCUMENTS 9,939,417 B2 4/2018 McPeek
9,983,311 B2 5/2018 McPeek
(Continued)

FOREIGN PATENT DOCUMENTS

WO WO-2021134114 A1 * 7/2021 ............. G06T 17/05

OTHER PUBLICATIONS

Dungey, Heidi S., et al. "Phenotyping whole forests will help to track genetic performance." Trends in plant science 23.10 (2018): 854-864. (Year: 2018).*

*Primary Examiner* — Daniel F Hajnik
(74) *Attorney, Agent, or Firm* — Allen, Dyer, Doppelt + Gilchrist, PA

(57) ABSTRACT

An agricultural modeling system may include a mobile LiDAR platform configured to generate 3D point cloud data of an agricultural geographic area, client devices, a geospatial database configured to store a data layer for the agricultural geographic area, and a server computing resource in communication with the mobile LiDAR platform, the client devices, and the geospatial database. The server computing resource may be configured to geographically reference the data layer fused with the 3D point cloud data of the agricultural geographic area, and generate a multi-layered data model for the geographically referenced data layer fused with the 3D point cloud data of the agricultural geographic area for providing interactive analysis and visualization of agricultural information alongside collaborators with LiDAR-based high resolution 3D plant model. A client device may be configured to selectively render the multi-layered data model.

20 Claims, 14 Drawing Sheets

(52) U.S. Cl.
CPC ...... *G06T 2200/08* (2013.01); *G06T 2210/56* (2013.01); *G06T 2215/12* (2013.01); *G06T 2215/16* (2013.01)

(56) References Cited

U.S. PATENT DOCUMENTS

| | | |
|---|---|---|
| 10,151,839 B2 | 12/2018 | McPeek |
| 10,346,725 B2 | 7/2019 | Weller et al. |
| 10,371,683 B2 | 8/2019 | McPeek |
| 10,520,482 B2 | 12/2019 | McPeek |
| 10,534,086 B2 | 1/2020 | McPeek |
| 10,539,545 B2 | 1/2020 | McPeek |
| 2008/0059889 A1* | 3/2008 | Parker .................. G06F 16/29 715/748 |
| 2012/0215817 A1* | 8/2012 | Wheeler ................ G06F 16/29 707/803 |
| 2013/0174040 A1* | 7/2013 | Johnson ................ G06Q 10/06 715/733 |
| 2019/0129039 A1* | 5/2019 | Schubert ................ G08G 5/006 |
| 2020/0019777 A1* | 1/2020 | Gurzoni, Jr. ............ G06K 9/34 |
| 2020/0033312 A1 | 1/2020 | Overton et al. |
| 2020/0132651 A1 | 4/2020 | McPeek |
| 2020/0144849 A1* | 5/2020 | Thomson .......... H02J 7/007192 |

\* cited by examiner

AGRICULTURAL MODELING SYSTEM WITH DATA FUSION AND RELATED SERVER COMPUTING RESOURCE AND METHODS

TECHNICAL FIELD

The present disclosure relates to the field of geospatial systems, and, more particularly, to an agricultural modeling system and related methods.

BACKGROUND

Agriculture is an endeavor practiced for thousands of years. Nevertheless, the industry of agriculture has advanced greatly in the last few decades. Key tasks within agriculture are forecasting and prediction of crop yields, reduction of costs of production, and ensuring sustainable production practices. A great deal of production data is collected throughout the season, however, this data is collected at different scales, on different systems, and with different methodologies. Current approaches consider each data source independently and may not aggregate data. Inaccuracies lead to increased production costs, poor forecasting and yield estimates, and greater environmental impact. In order to enhance the value of these different data sources, it may be helpful to organize and link across all of these different scales, systems, and methodologies. This may require digitizing all of these data sources, including a high-resolution base layer including a per-plant three-dimensional (3D) model. This may allow for the linkages of all of these various data sources.

One advantageous approach is disclosed in U.S. Pat. No. 10,534,086 to McPeek, assigned to the present application's assignee, the contents are which are hereby incorporated by reference in their entirety. This system is for improved real-time yield monitoring and sensor fusion of crops in an orchard. The system may include a collection vehicle, a modular processing unit, a volume measurement module, a 3D point cloud scanning module, an inertial navigation system, and a post-processing server.

SUMMARY

Generally, an agricultural modeling system is used for processing data for an agricultural geographic area. The agricultural modeling system may include a mobile light detection and ranging (LiDAR) platform configured to generate 3D point cloud data of the agricultural geographic area, a plurality of client devices, a geospatial database configured to store at least one data layer for the agricultural geographic area, and a server computing resource (e.g. cloud computing resources, a standalone computing device, a computing cluster, or a combination thereof) in communication with the mobile LiDAR platform, the plurality of client devices, and the geospatial database. The server computing resource/ cluster may be configured to geographically reference the at least one data layer fused with the 3D point cloud data of the agricultural geographic area, and generate a multi-layered data model for the geographically referenced at least one data layer fused with the 3D point cloud data of the agricultural geographic area for providing interactive analysis and visualization of agricultural information alongside collaborators with LiDAR-based high resolution 3D plant model. A given client device from the plurality of client devices may be configured to selectively render the multi-layered data model.

Additionally, the at least one data layer for the agricultural geographic area may comprise a plurality of data layers for the agricultural geographic area comprising a climate data source, a soil survey data source, a satellite imagery data source, and a tree phenotyping data source, for example. The at least one data layer for the agricultural geographic area may have a resolution less than or equal to the 3D point cloud data of the agricultural geographic area. The 3D point cloud data may comprise a Keyhole Markup Language polygon defining the agricultural geographic area.

In some embodiments, the server computing resource and the given client device may be configured to execute a programming code script, and the given client device may be configured to selectively render the multi-layered data model based upon the programming code script. The given client device may be configured to upload an additional data source to the server computing resource, and the server computing resource may be configured to geographically reference the additional data source and the 3D point cloud data of the agricultural geographic area.

Also, the server computing resource may be configured to generate a different multi-layered data model for each client device using a respective different at least one data layer. The given client device may comprise a notebook client device, and the at least one data layer may be associated with at least one notebook workflow. The mobile LiDAR platform may comprise at least one of an airborne platform and a ground platform, for instance.

Another aspect is directed to a server computing resource in an agricultural modeling system for processing data for an agricultural geographic area. The agricultural modeling system may include a mobile LiDAR platform configured to generate 3D point cloud data of the agricultural geographic area, a plurality of client devices, and a geospatial database configured to store at least one data layer for the agricultural geographic area. The server computing resource may include a processing unit and storage device or a group of processing nodes and a distributed storage service cooperating therewith and configured to receive the 3D point cloud data of the agricultural geographic area from the mobile LiDAR platform, and receive the at least one data layer for the agricultural geographic area from the geospatial database. The processing unit may be configured to geographically reference the at least one data layer fused with the 3D point cloud data of the agricultural geographic area, and generate a multi-layered data model for the geographically referenced at least one data layer fused with the 3D point cloud data of the agricultural geographic area for providing interactive analysis and visualization of agricultural information alongside collaborators with LiDAR-based high resolution 3D plant model. A given client device from the plurality of client devices may be configured to selectively render the multi-layered data model.

Yet another aspect is directed to a method for operating a server computing resource in an agricultural modeling system for processing data for an agricultural geographic area. The agricultural modeling system may include a mobile LiDAR platform configured to generate 3D point cloud data of the agricultural geographic area, a plurality of client devices, and a geospatial database configured to store at least one data layer for the agricultural geographic area. The method may include receiving the 3D point cloud data of the agricultural geographic area from the mobile LiDAR platform, and receiving the at least one data layer for the agricultural geographic area from the geospatial database, and geographically referencing the at least one data layer fused with the 3D point cloud data of the agricultural geographic area. The method may comprise generating a multi-layered data model for the geographically referenced at least one data layer fused with the 3D point cloud data of the agricultural geographic area for providing interactive analysis and visualization of agricultural information alongside collaborators with LiDAR-based high resolution 3D plant model. A given client device from the plurality of client devices may be configured to selectively render the multi-layered data model.

DETAILED DESCRIPTION

Figure 1:
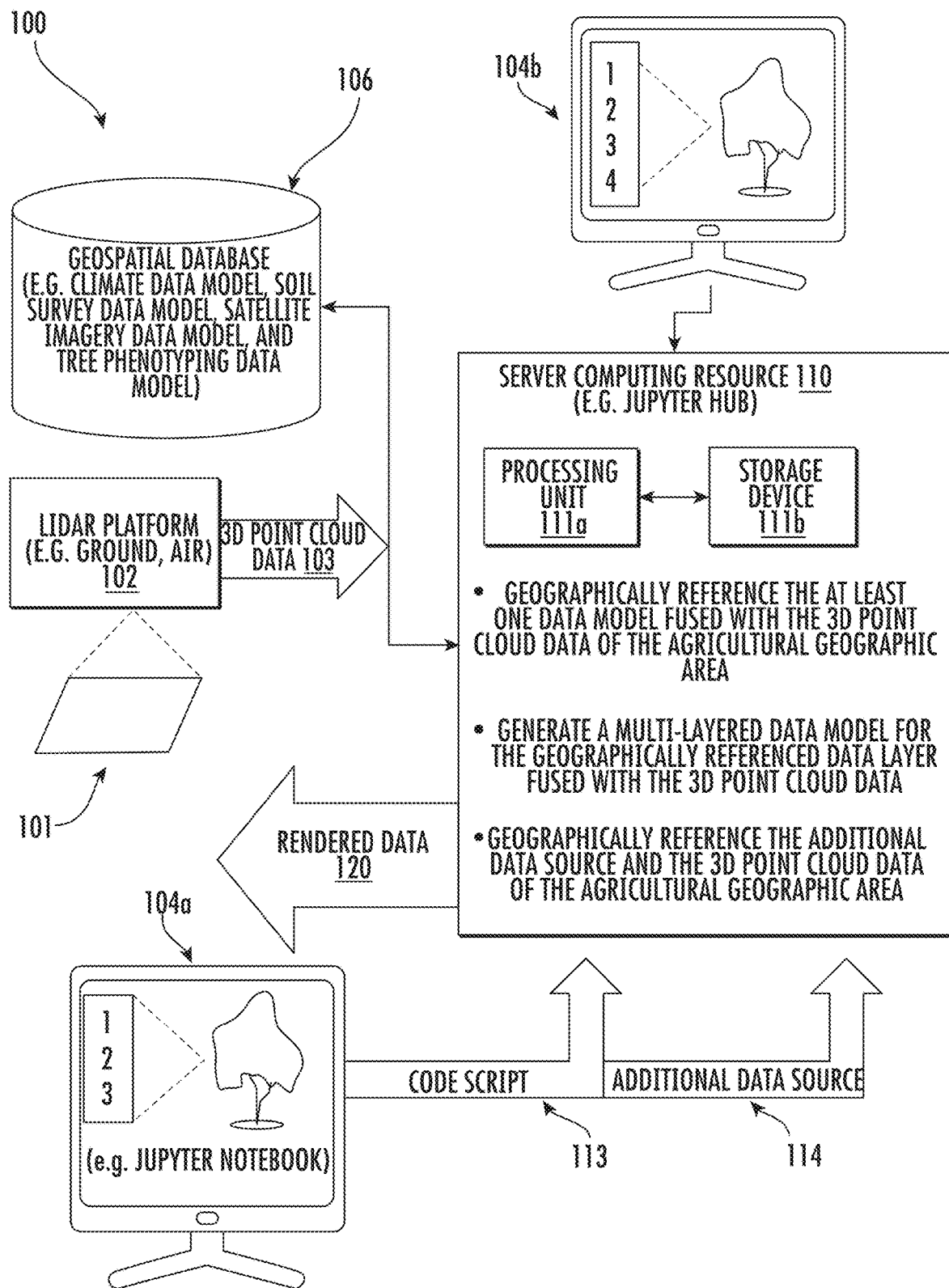
FIG. 1 is a schematic diagram of an exemplary environment of a first embodiment of an agricultural modeling system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Precision Agriculture (PA) technologies are being adopted throughout many different areas of agricultural industries as their high-tech infrastructures and software ecosystems are continuously evolving, such as LiDAR sensor devices, drones, robots, 5G wireless networks, big data/supercomputing clusters, artificial intelligence (AI), cloud computing environment, and cloud native geospatial frameworks. Over the past decade, the scale and complexity of agricultural technology hardware and software systems have advanced from a single sensor source with only a few gigabytes collection data to bundled sources from a sensor group streaming out terabyte- and even petabyte-scale collection datasets. In other words, the amount of information technology (IT) resource overhead in agricultural technology is growing.

On the day-to-day operation, consuming large volume PA data sources not only brings a technical challenge for the traditional IT infrastructures, but also adds a significant overhead for grower and agronomist to learn and accept the emerging agricultural technologies. All of this complexity and expense have led to the relatively slow adoption of PA-driven farm operation, management, and risk assessment across the United States. However, in recent years, growers, especially, research teams in a farm organization have become more and more engaged into the emerging potentials happening in this particular area as the agricultural science keeps pushing its capacity and capability into the next level.

Referring initially to FIGS. 1-5, an agricultural modeling system 100 according to the present disclosure is now described. The agricultural modeling system 100 is for processing data for an agricultural geographic area 101 and provides an approach to the above described problems with typical technologies. The agricultural modeling system 100 is designed to bridge the technology adoption gap between end users and the LiDAR software stack and help growers or researchers to process, analyze, and share the large-scale ground/aerial LiDAR data sources intuitively and transparently.

The agricultural modeling system 100 illustratively includes a mobile LiDAR platform 102 configured to generate 3D point cloud data 103 of the agricultural geographic area 101. The mobile LiDAR platform 102 may include either or both of an airborne platform (e.g. unmanned aerial vehicle (UAV), aircraft) or a ground platform (e.g. tripod or ground vehicle mounted sensor). Also, in some embodiments, the 3D point cloud data 103 may comprise a KML polygon defining the boundaries of the agricultural geographic area 101.

The agricultural modeling system 100 illustratively comprises a plurality of client devices 104a-104b. For example, each of the plurality of client devices 104a-104b may comprise, but are not limited to, a desktop computer, a personal laptop, a portable tablet device, a smart mobile phone, an embedded computer on the mobile LiDAR device, and/or an automobile computer system. In some embodiments, each of the plurality of client devices 104a-104b may be configured to launch a notebook service instance from the remote computing server or cluster and execute notebook code on the provisioned notebook service interactively.

The agricultural modeling system 100 illustratively comprises a geospatial database 106 configured to store a plurality of data layers 107a-107e for the agricultural geographic area 101. More specifically and as perhaps best seen in FIGS. 3-4, the plurality of data layers 107a-107e for the agricultural geographic area 101 may include a climate data source, a soil survey data source, a water data source, a satellite imagery data source, a tree phenotyping data source, and a farm/block boundary information. Of course, these data source types are exemplary, and any data source for the agricultural geographic area 101 may be used.

Some of the plurality of data layers 107a-107e are sourced from third party sources 107d-107e (shown with dashed lines), and the remaining data layers 107a-107c are sourced from geospatial and ground-truth data sources (shown with solid lines). In other words, the remaining data layers 107a-107c have accurate geospatial data embedded therein.

The agricultural modeling system 100 illustratively includes a server computing resource 110 in communication with the mobile LiDAR platform 102, the plurality of client devices 104a-104b, and the geospatial database 106. In the illustrated embodiment, the server computing resource 110 illustratively comprises a processing unit 111a and a storage device 111b coupled thereto. In some embodiments, the server computing resource 110 comprises resources in a cloud computing platform (i.e. infrastructure as a service (IaaS)), such as Amazon Web Services (AWS), Microsoft Azure, or Google Cloud Platform. Of course, in other embodiments, the server computing resource 110 may comprise an on-premises computing server, or computing cluster (i.e. an amalgamation of computing resources) or a combination of the on-premises computing server/cluster and the cloud computing platform.

The server computing resource 110 is configured to geographically reference the plurality of data layers 107a-107e fused with the 3D point cloud data 103 of the agricultural geographic area 101. As will be appreciated, the data fusion comprises integration/combination of the plurality of data layers 107a-107e and the 3D point cloud data 103.

The server computing resource 110 is configured to generate a multi-layered data model 112 for the geographically referenced data layers 107a-107e fused with the 3D point cloud data 103 of the agricultural geographic area 101 for providing interactive analysis and visualization of agricultural information alongside collaborators through the client devices 104a-104b with LiDAR-based high resolution 3D plant model. In the multi-layered data model 112, each of the plurality of data layers 107a-107e comprises a separate data source.

Figure 4:
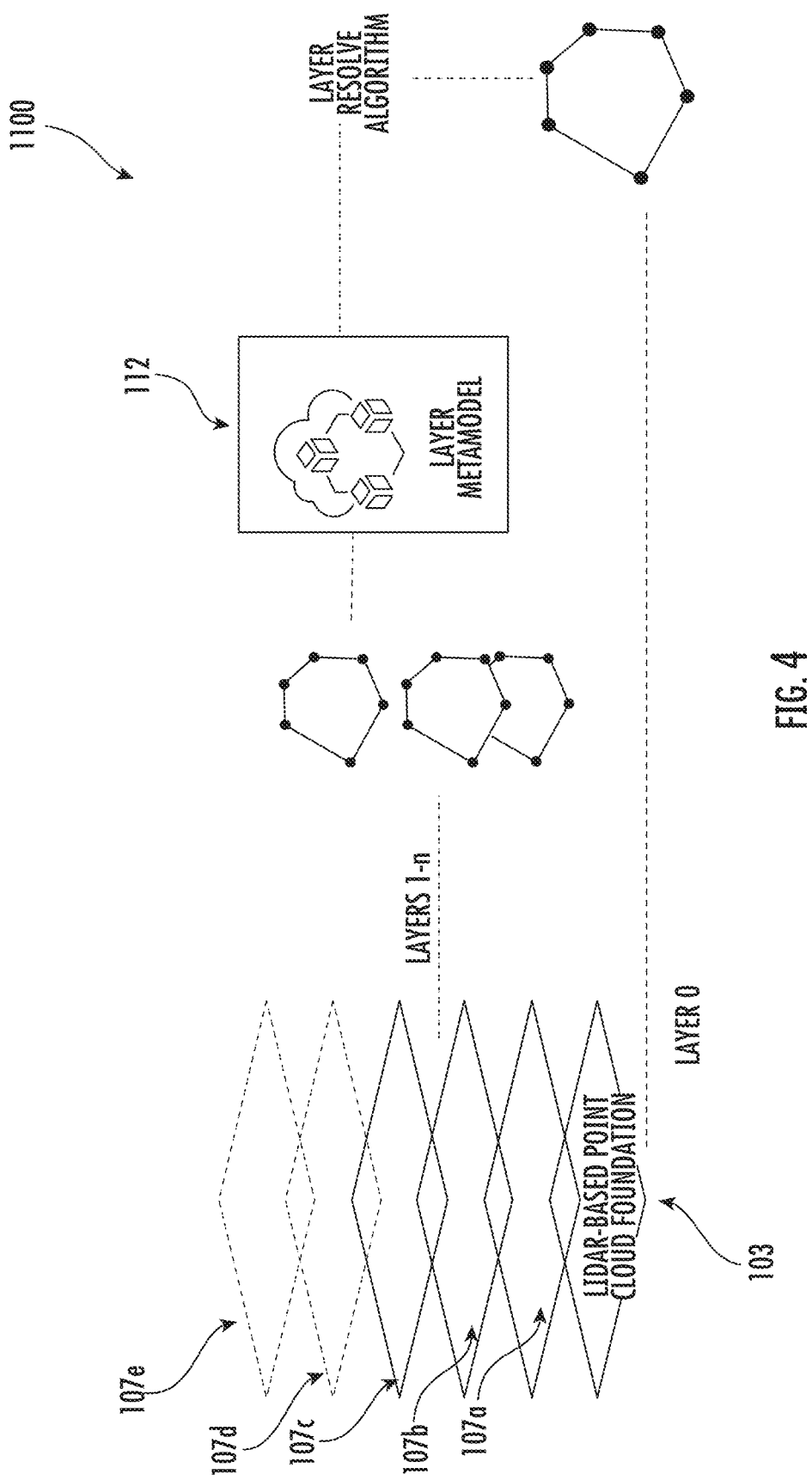
FIGS. 4-5 are schematic diagrams of geographically referencing layers in the multi-layered data model in the agricultural modeling system of FIG. 1.
Figure 5:
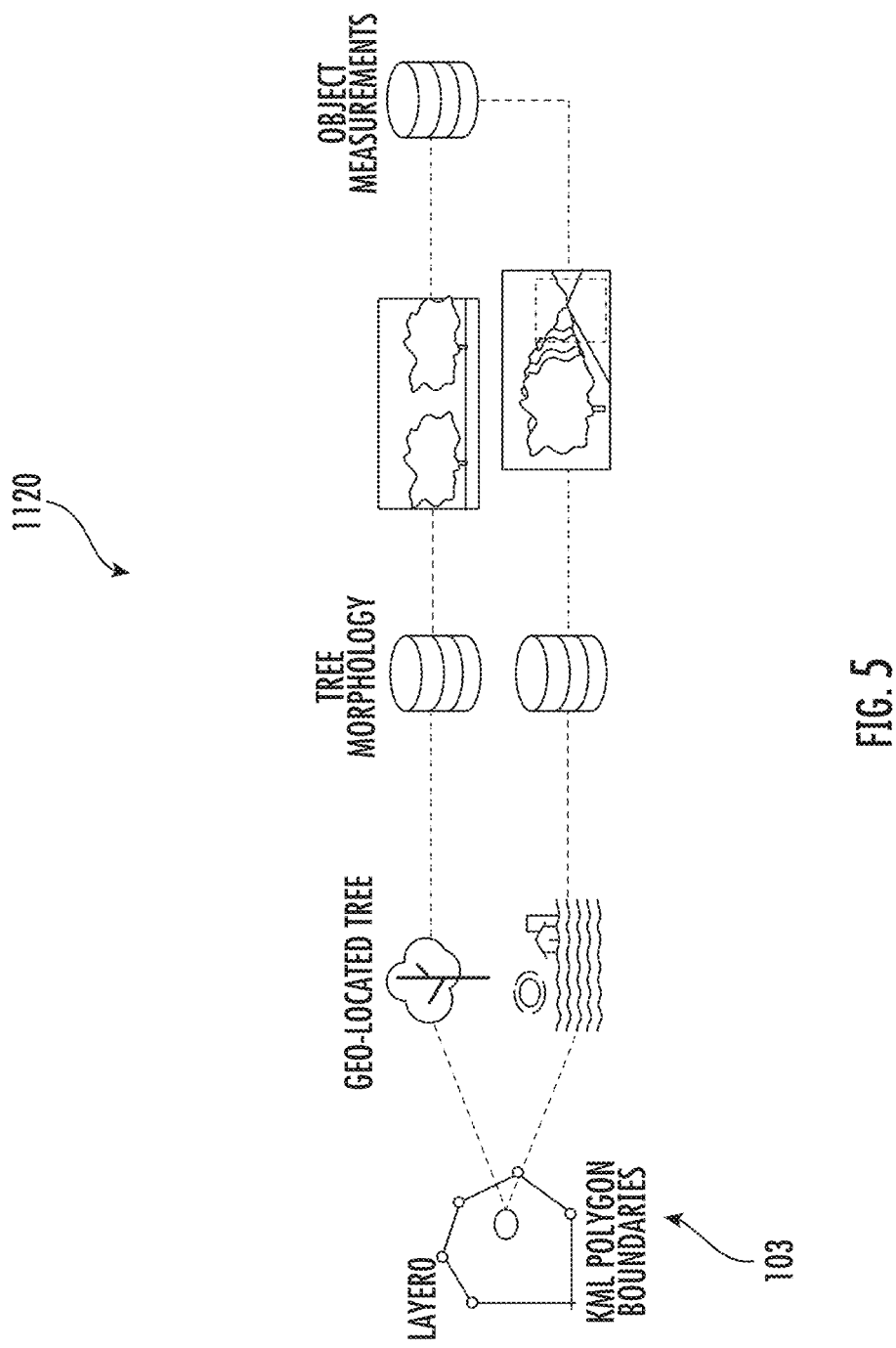

As perhaps best seen in diagrams 1100, 1120 of FIGS. 4-5, the server computing resource 110 is configured to execute a layer resolving algorithm. The layer resolving algorithm may comprise a scaling step for each the plurality of data layers 107a-107e to properly size a respective data layer with the 3D point cloud data 103 of the agricultural geographic area 101.

For each layer, one polygon defines the geographic boundaries. Layer 0 is the 3D point cloud data 103, representing the truth value or foundation polygon (i.e. having the highest accuracy and confidence values). As discussed hereinabove, the 3D point cloud data 103 has the highest resolution. In some embodiments, the 3D point cloud data 103 has mm-level pixel precision, and each plant is geolocated within the 3D point cloud data (i.e. each detected plant has an associated geolocation value). Some of the plurality of data layers 107a-107e may comprise multi-dimensional polygons (e.g. having height data values), for example, the 3D point cloud data 103.

A given client device 104a from the plurality of client devices is configured to selectively render the multi-layered data model 112. As illustrated, the given client device 104a renders the multi-layered data model 112 with the data sources included in three data layers 107a-107e while the other client device 104b renders the same multi-layered data model 112 with a different data source group aggregated from four data layers 107a-107e. The given client device 104a may comprise a notebook client device, and each data layer 107a-107e may be associated with at least one notebook workflow.

Some or all of the plurality of data layers 107a-107e for the agricultural geographic area 101 have a resolution less than or equal to the 3D point cloud data 103 of the agricultural geographic area. In other words, each pixel or point in the point cloud covers a space smaller than a respective space for a pixel size in the plurality of data layers 107a-107e.

The server computing resource 110 and the given client device 104a are configured to execute a programming code script 113 uploaded from the given client device. The given client device 104a is configured to selectively render the multi-layered data model 112 based upon the programming code script. In other words, in addition to the selective rendering of the multi-layered data model 112 (which can be unique for each client device 104a-104b), the respective user of the given client device 104a may provide custom code to provide unique renderings and data fusion functionality.

The given client device 104a is configured to upload an additional data source 114 to the server computing resource 110. The server computing resource 110 is configured to geographically reference and fuse the additional data source 114 and the 3D point cloud data 103 of the agricultural geographic area. The server computing resource 110 is configured to generate a different multi-layered data model 112 for each client device 104a-104b using a respective different plurality of data layers 107a-107e.

Although only two client devices are shown for illustrative clarity, the agricultural modeling system 100 is configured to serve a large number of client devices 104a-104b. Moreover, the agricultural modeling system 100 may organize the plurality of client devices 104a-104b into subsets, each subset being associated with an institutional client. The server computing resource 110 is configured to securely store data for each of the institutional clients of the agricultural modeling system 100. For example, some of the different plurality of data layers 107a-107e may be proprietary to a given institutional client; therefore, the server computing resource 110 is configured to only allow access to the different plurality of data layers for client devices 104a-104b associated with the institutional client. On the other hand, some of the different plurality of data layers 107a-107e may be publicly available datasets, which are available to all the client devices 104a-104b, regardless of the associated institutional client. Similarly, any uploaded programming code script 113 or uploaded additional data source 114 are maintained securely for the institutional client associated with the given client device 104a, and these are fully isolated from other unrelated client devices.

Advantageously, the agricultural modeling system 100 may address the scalability problem with geospatial data fusion in agricultural technologies. Firstly, the agricultural modeling system 100 may place the server computing resource 110 partially or wholly into a computing cluster 210 (FIG. 6A) hosted in a public or private cloud computing platform (e.g. IaaS), which provides virtually infinite scalability for both storage and compute needs. Secondly, for institutional clients with proprietary datasets, the agricultural modeling system 100 is capable of ingesting these specialized datasets and overlaying them with publicly available domain datasets for selective rendering to the users of the institutional client. Thirdly, the agricultural modeling system 100 permits institutional clients to have a subset of client devices 104a-104b that can readily collaborate and share custom code scripts and data.

Figure 2:
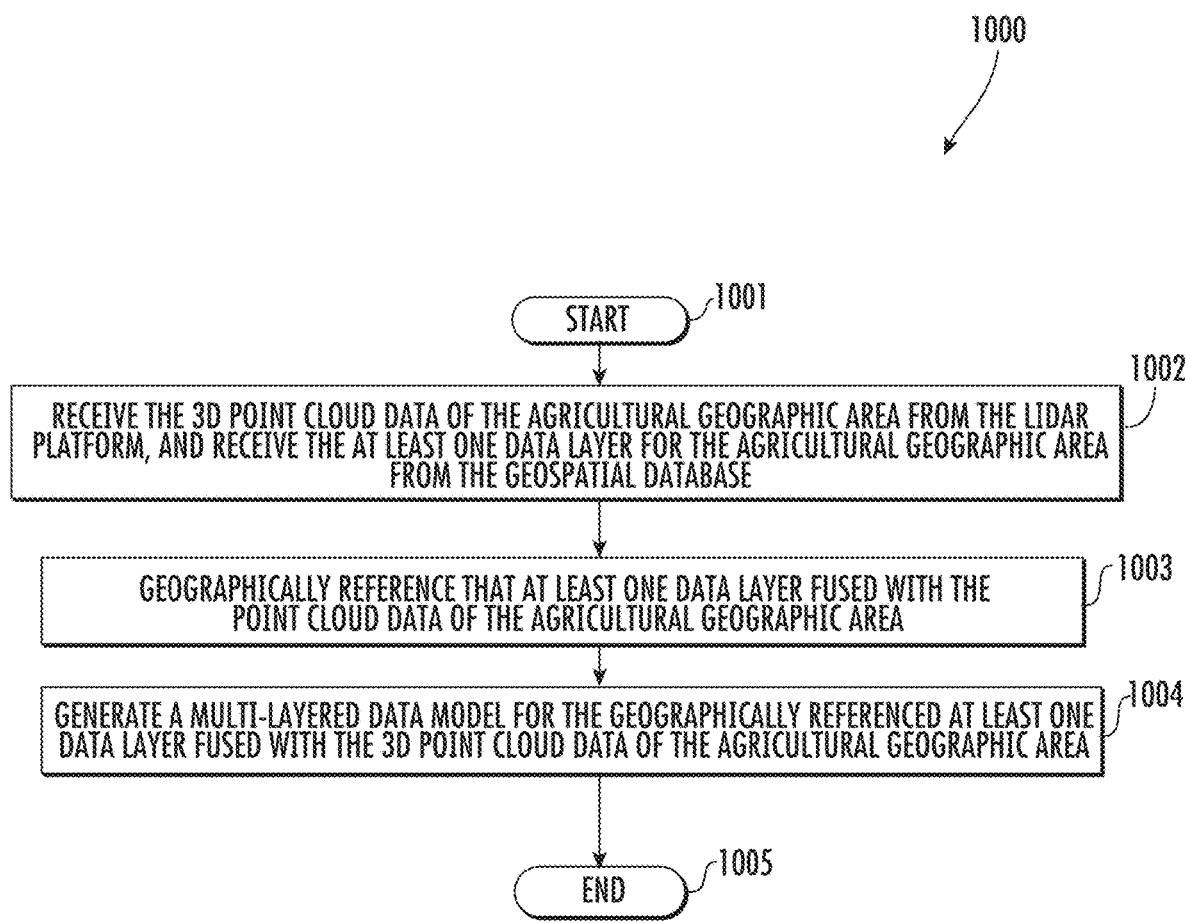
FIG. 2 is a flowchart for a method of operating a server computing resource in the agricultural modeling system of FIG. 1.
Figure 3:
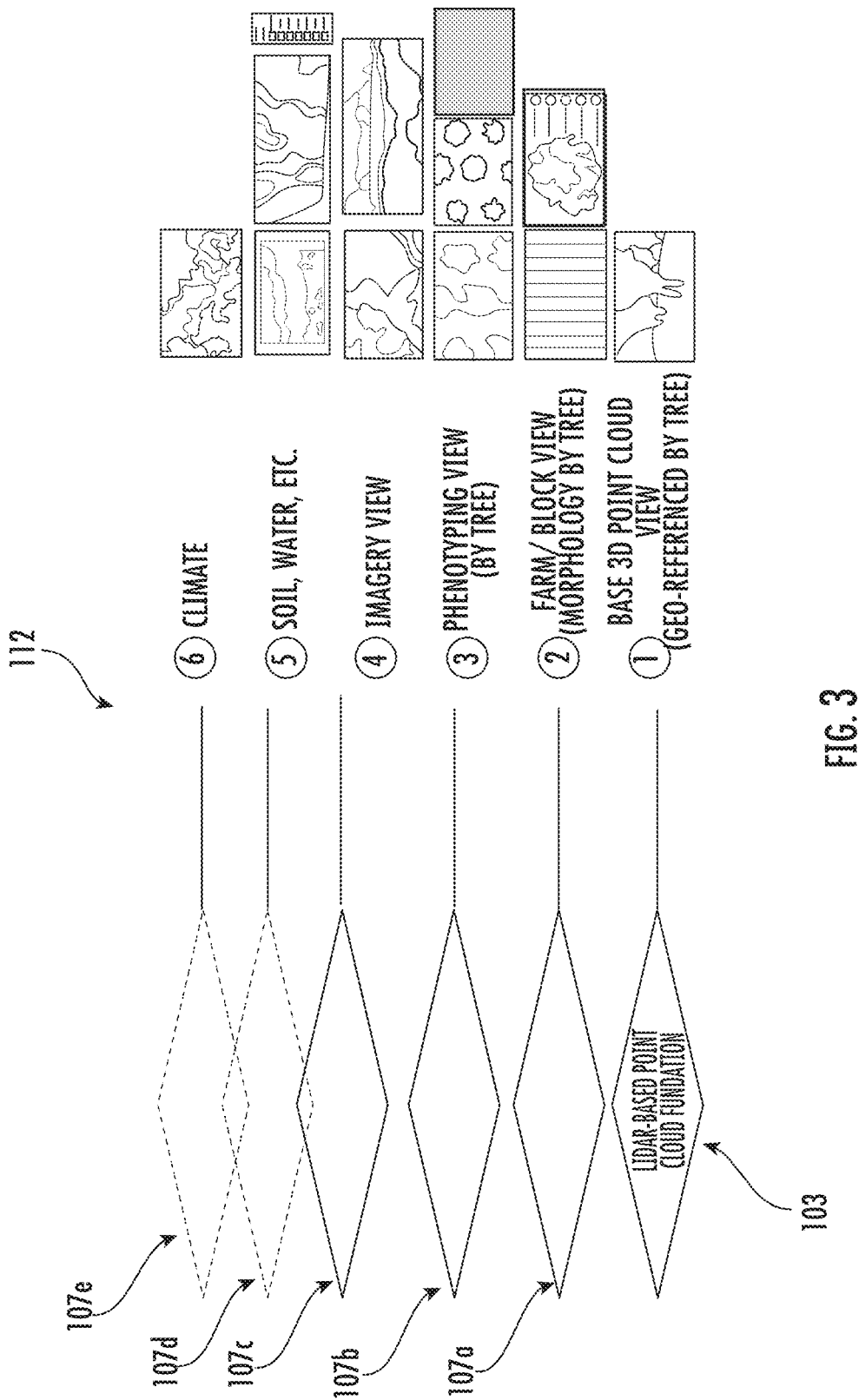
FIG. 3 is a schematic diagram of layers in the multi-layered data model in the agricultural modeling system of FIG. 1.

Referring briefly to FIG. 2, a method for operating the server computing resource 110 in an agricultural modeling system 100 for processing data for an agricultural geographic area 101 is now described with reference to a flowchart 1000, which begins at Block 1001. The agricultural modeling system 100 comprises a mobile LiDAR platform 102 configured to generate 3D point cloud data 103 of the agricultural geographic area 101, a plurality of client devices 104a-104b, and a geospatial database 106 configured to store at least one data layer 107a-107e for the agricultural geographic area. The method includes receiving the 3D point cloud data 103 of the agricultural geographic area 101 from the mobile LiDAR platform 102, and receiving the at least one data layer 107a-107e for the agricultural geographic area 101 from the geospatial database 106 (Block 1002). The method further comprises geographically referencing the at least one data layer 107*a*-107*e* fused with the 3D point cloud data 103 of the agricultural geographic area 101 (Block 1003). The method also includes generating a multi-layered data model 112 for the geographically referenced at least one data layer 107*a*-107*e* fused with the 3D point cloud data 103 of the agricultural geographic area 101 for providing interactive analysis and visualization of agricultural information alongside collaborators with LiDAR-based high resolution 3D plant model. (Block 1004). A given client device 104*a* from the plurality of client devices is configured to selectively render the multi-layered data model 112. The method ends at Block 1005.

Figure 6A:
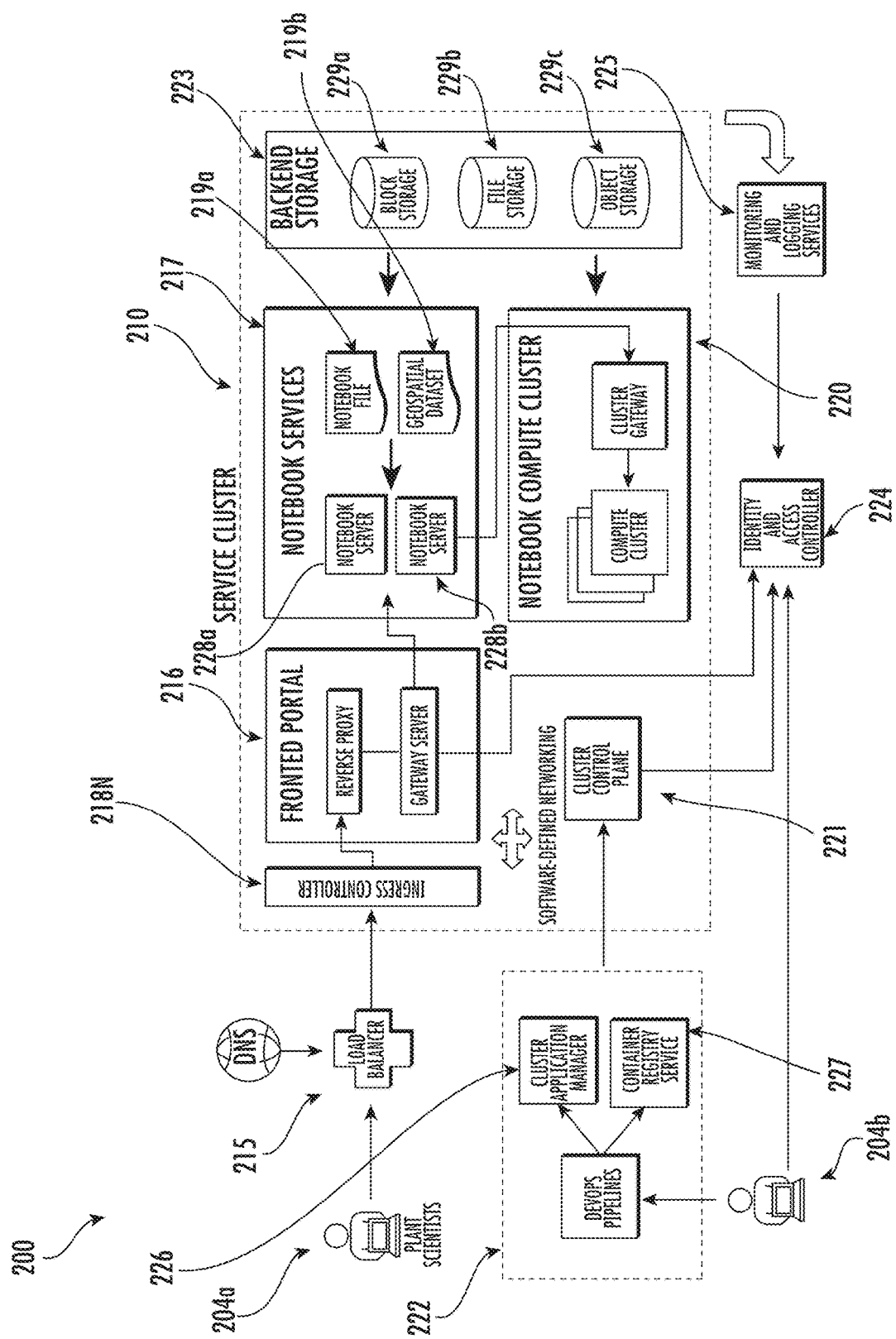
FIG. 6A is a schematic diagram of an exemplary environment of a second embodiment of the agricultural modeling system, according to the present disclosure.

Referring now additionally to FIG. 6A, another environment where the agricultural modeling system 200 may be implemented and deployed, according to some embodiments of the invention, is now described. In this embodiment of the agricultural modeling system 200, those elements already discussed above with respect to FIGS. 1-5 are incremented by 100 and most require no further discussion herein. This embodiment differs from the previous embodiment in that this agricultural modeling system 200 illustratively includes an external load balancer 215 deployed between the server computing resource 210 (e.g. illustrated computing cluster) and the client device 204*a*. A series of development and operations (DevOps) pipelines 222 are managed by the client device 204*b* of an infrastructure engineer and are indirectly connected with the cluster control plane 221 via a cluster application manager 226 and a container registry service 227. Meanwhile, the infrastructure engineer at another client device 204*b*, a cluster control plane 221, and monitoring and logging services 225 are governed by an identity and access controller 224. In addition, the authentication and authorization of the client device (e.g. plant scientists' computers) 204*a* is also governed by the identity and access controller 224 through a frontend portal 216. The server computing resource 210 illustratively includes a frontend portal 216 serving the internet traffic of the client device 204*a* via the external load balancer 215 and an ingress controller 218. The frontend portal 216 is also capable of provisioning and managing the notebook server 228*a*-228*b* and bridging it with the client device 204*a*. In notebook services 217, the notebook server 228*a*-228*b* can receive a request from the client device 204*a* selectively executing a notebook implementation file 219*a* with an input geospatial dataset 219*b*. To further scale the notebook service performance and capacity, a notebook compute cluster 220 can be requested and connected to the notebook server 228*a*-228*b*. All stateful information and layered datasets are designed to store into a backend data storage system 223, which provides a persistent storage layer for both the notebook services 217 and the notebook compute cluster 220 with various underlying data storage types such as block storage 229*a*, file storage 229*b*, and object storage 229*c*. In the server computing resource 210, each of service components is designed to be platform independent and cloud agnostic, and thus can be materialized into different code implementations and deployment forms as long as their service application programming interfaces (APIs) are compatible.

It should be appreciated that the illustrated embodiment is implemented as cloud agnostic, for example, the illustrated data analytics platform can be transparently deployed atop of public IaaS such as Microsoft Azure Cloud, Amazon Web Services, and Google Cloud Platform. Of course, this platform is merely exemplary and other private or public cloud computing platforms could be used. For example, and not by way of limitation, the definition of a notebook file 219 may be implemented by a Jupyter notebook JSON format (i.e. using Jupyter Notebook open source framework, as available from the Project Jupyter of NumFOCUS, Inc. of Austin, Tex.) or Zeppelin notebook JSON format, the notebook server 228*a*-228*b* may be extended to support the messaging protocol of Jupyter notebook server and its variations such as the messaging protocol of Interact server or the messaging protocol of Zeppelin server, the identity and access controller 224 may be implemented by the managed Azure Active Directory (AD) service or AWS Identity and Access Management (IAM) service, the notebook compute cluster 220 may be implemented by a Dask parallel computing framework or a Hadoop distributed computing framework, and the backend data storage system 223 may be connected with Azure Data Lake Storage Gen2 or Amazon Elastic Block Store (EBS), Amazon Elastic File System (EFS), and Amazon Simple Storage Service (S3).

Figure 6B:
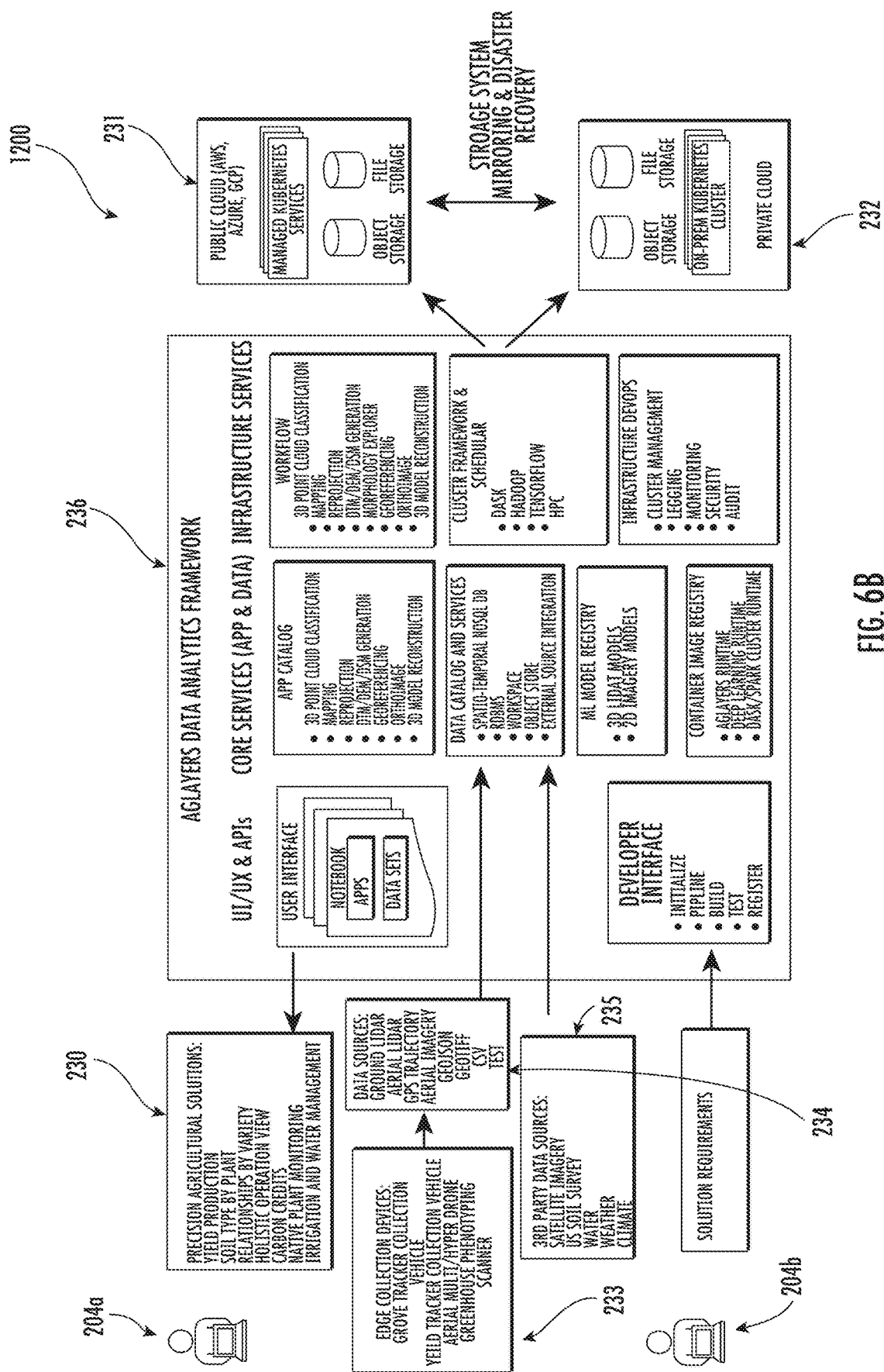
FIGS. 6B-6D are schematic diagrams of data flows in exemplary applications in the agricultural modeling system of FIG. 6A.
Figure 6C:
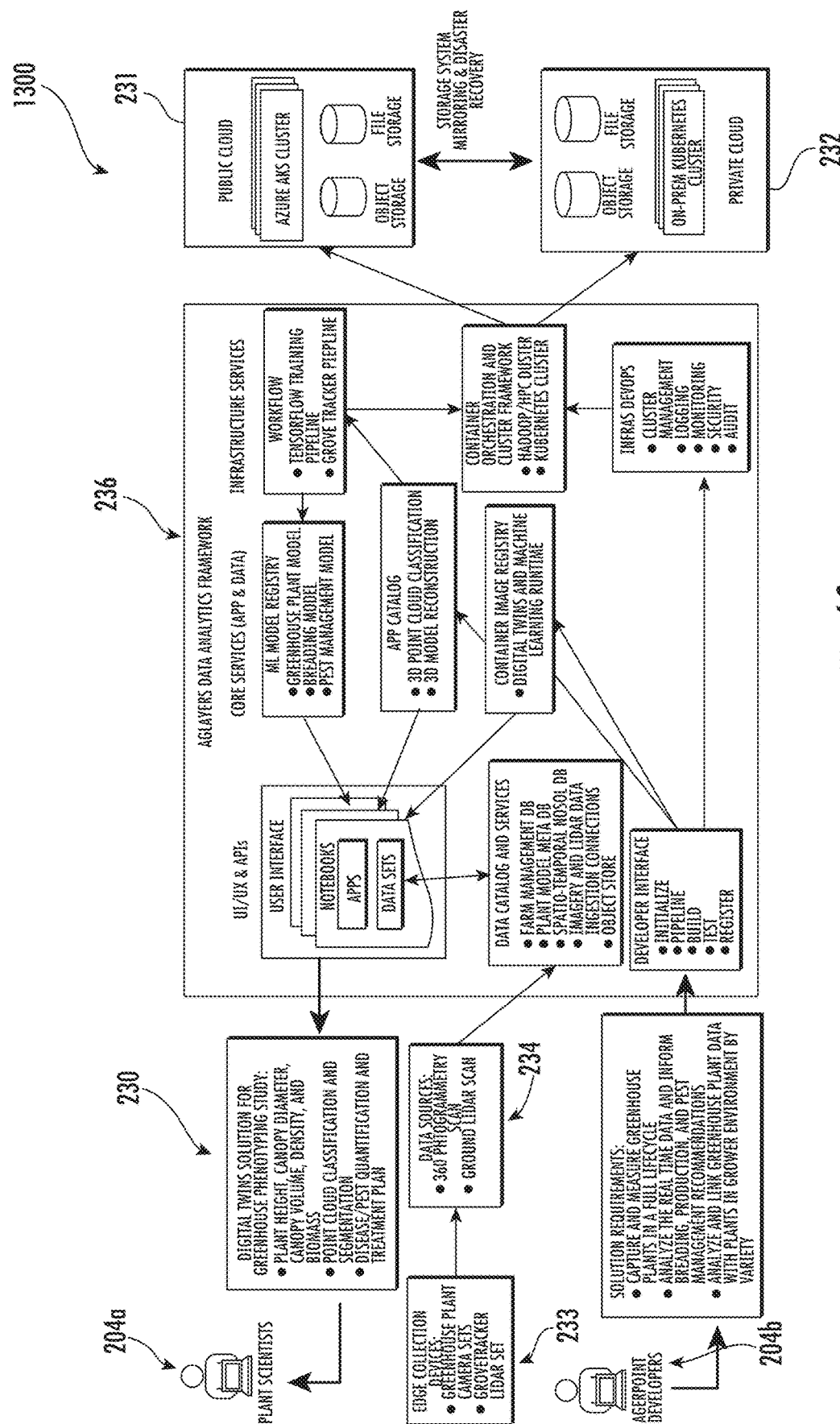
Figure 6D:
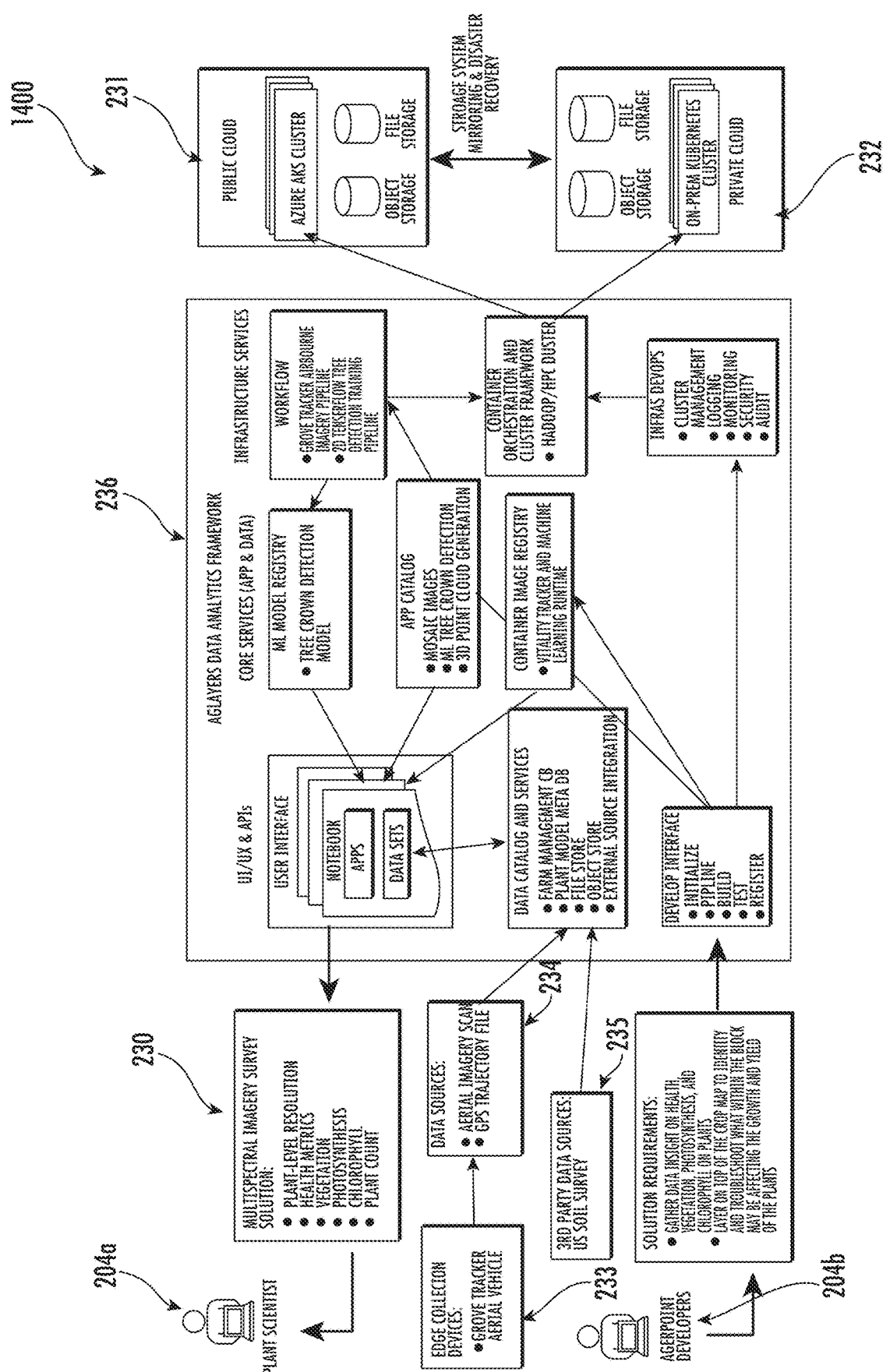
Figure 7A:
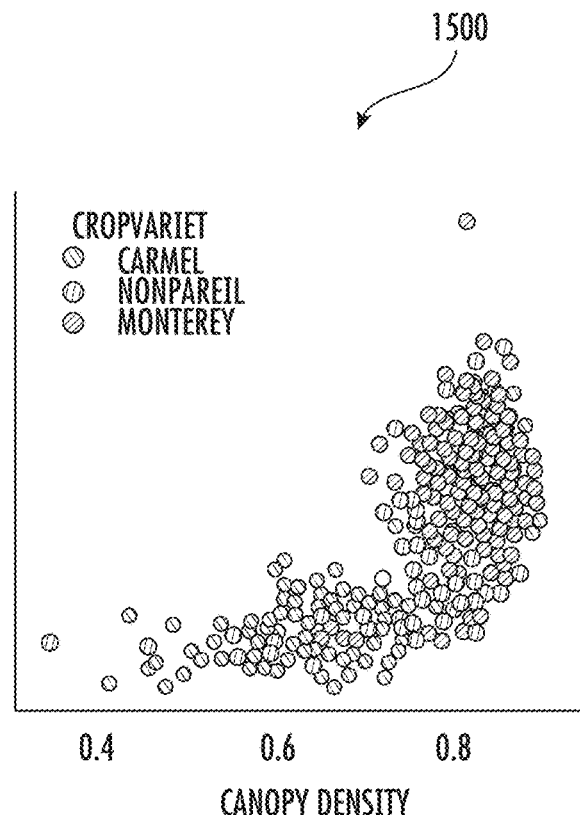
FIGS. 7A & 7B, and 8-11 are diagrams of the rendered multi-layered data model in the agricultural modeling system of FIG. 6A.
Figure 7B:
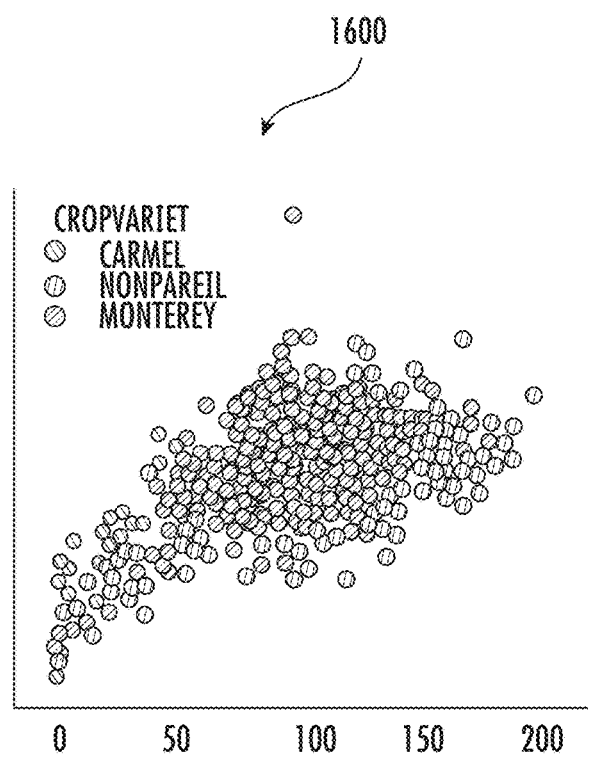
Figure 8:
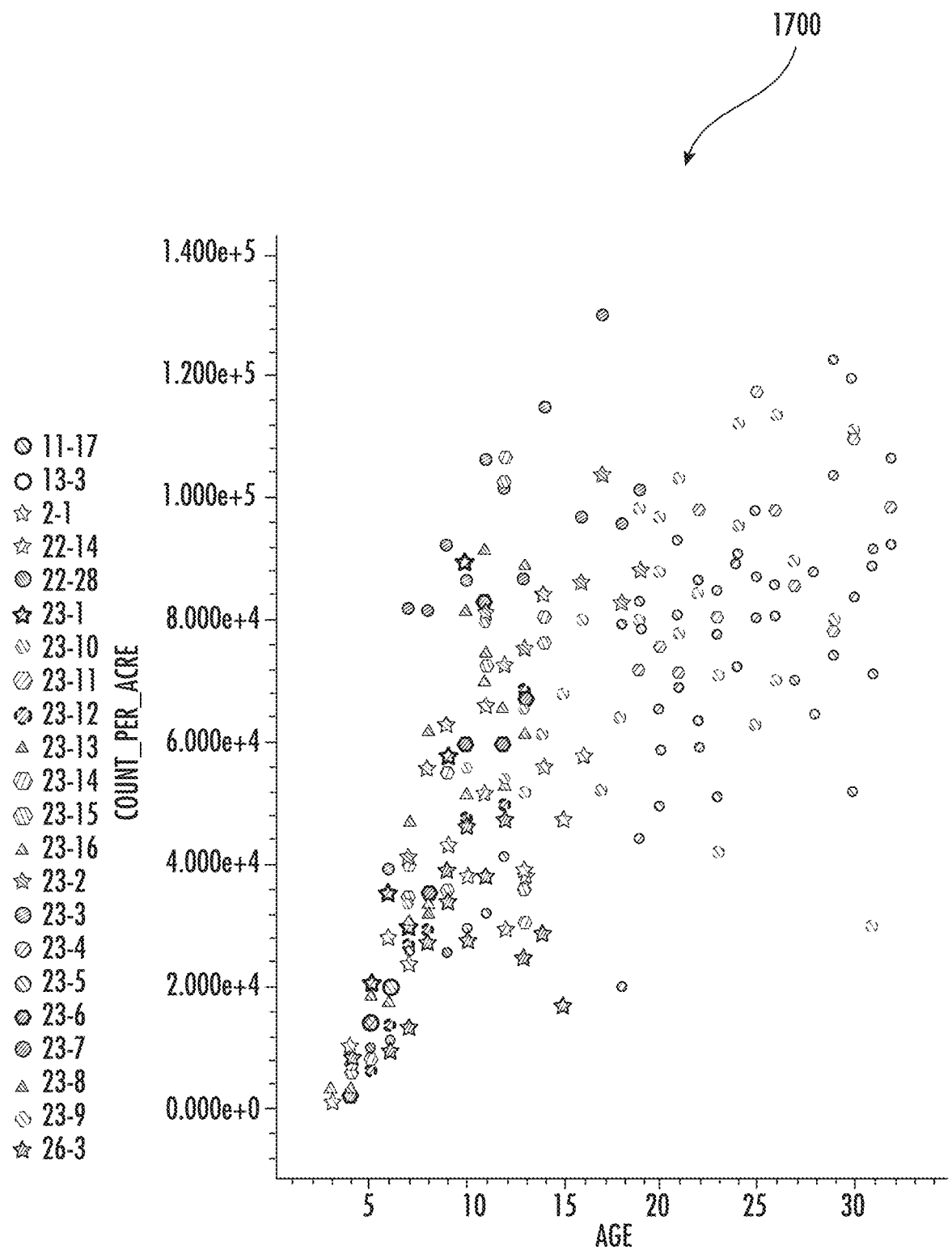
Figure 9:
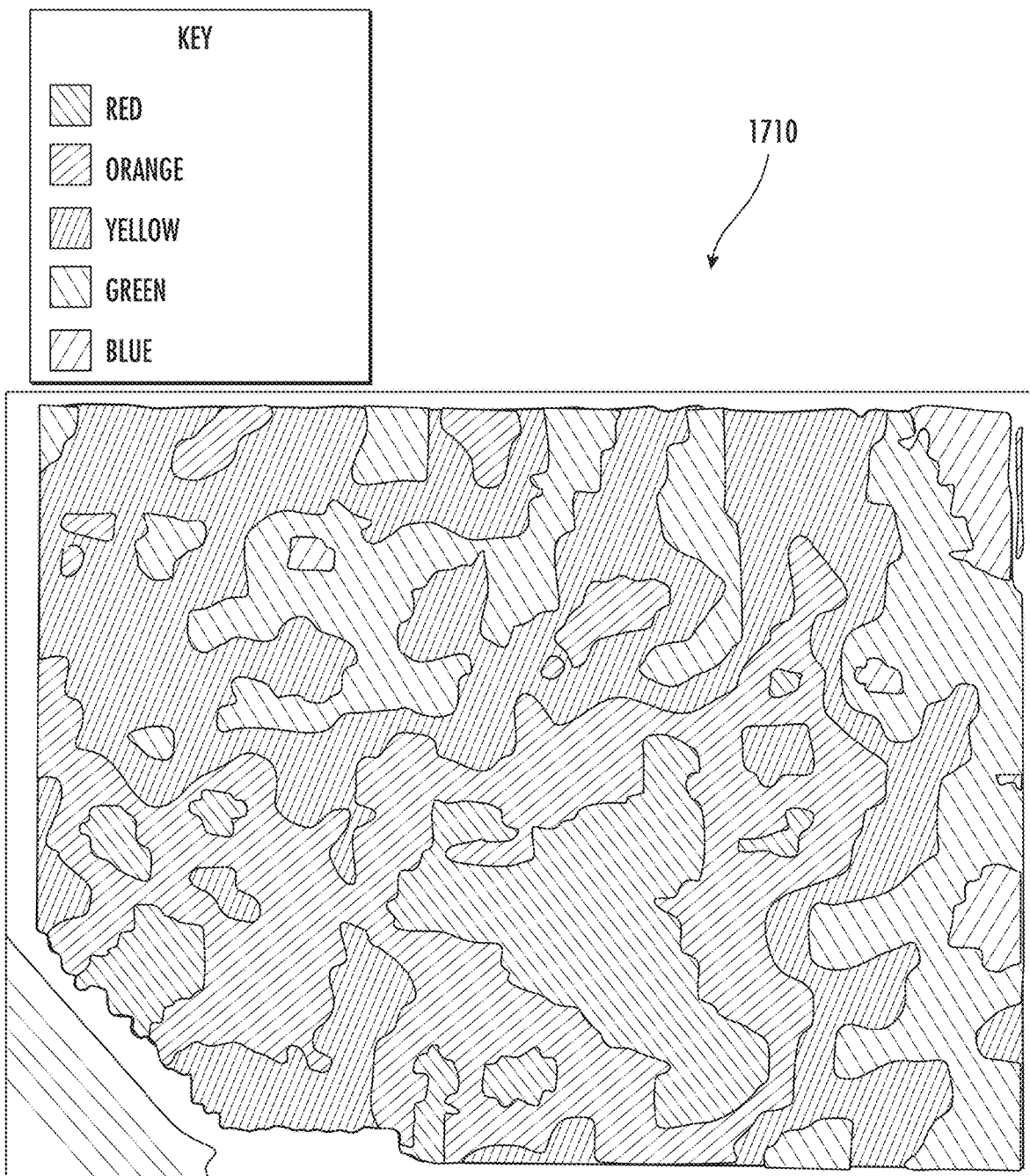
Figure 10:
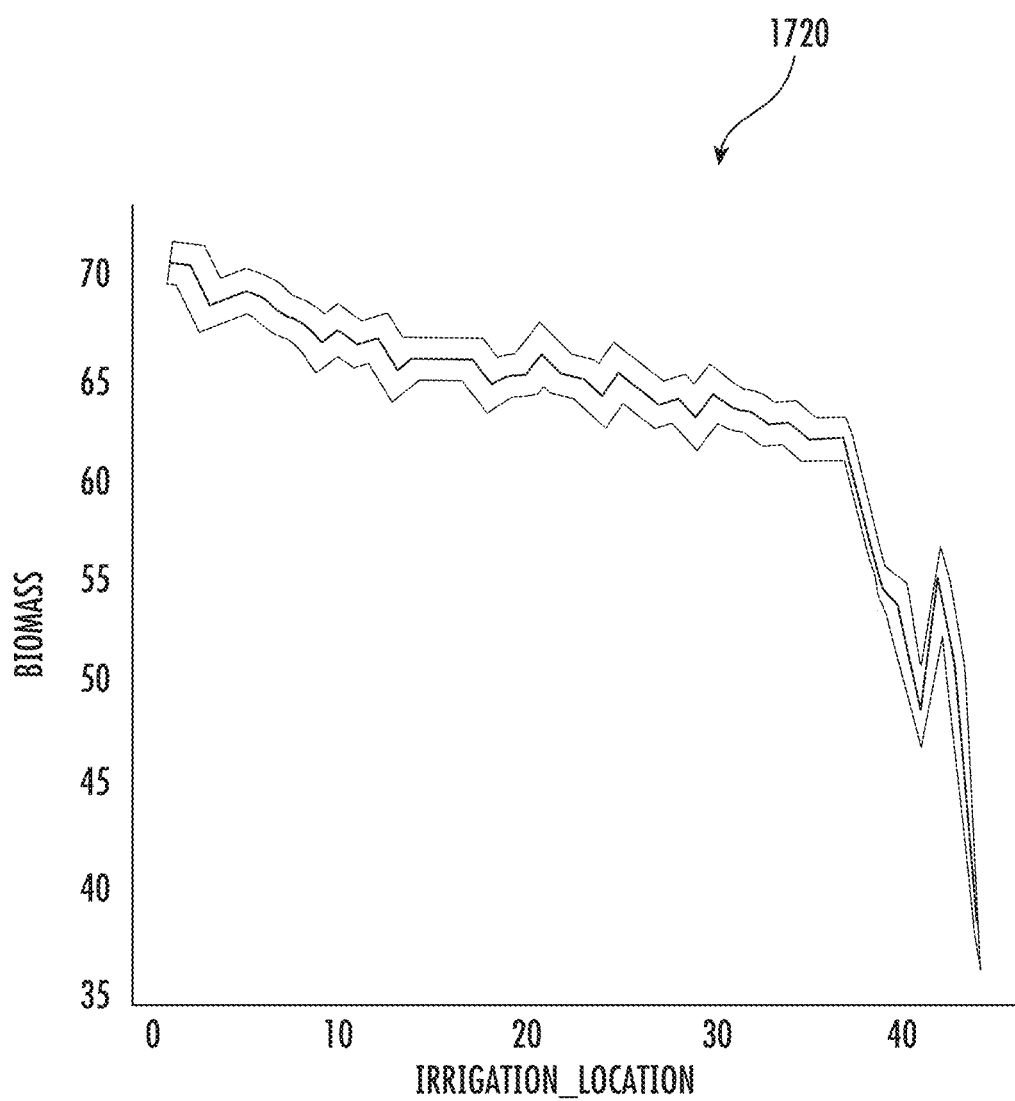
Figure 11:
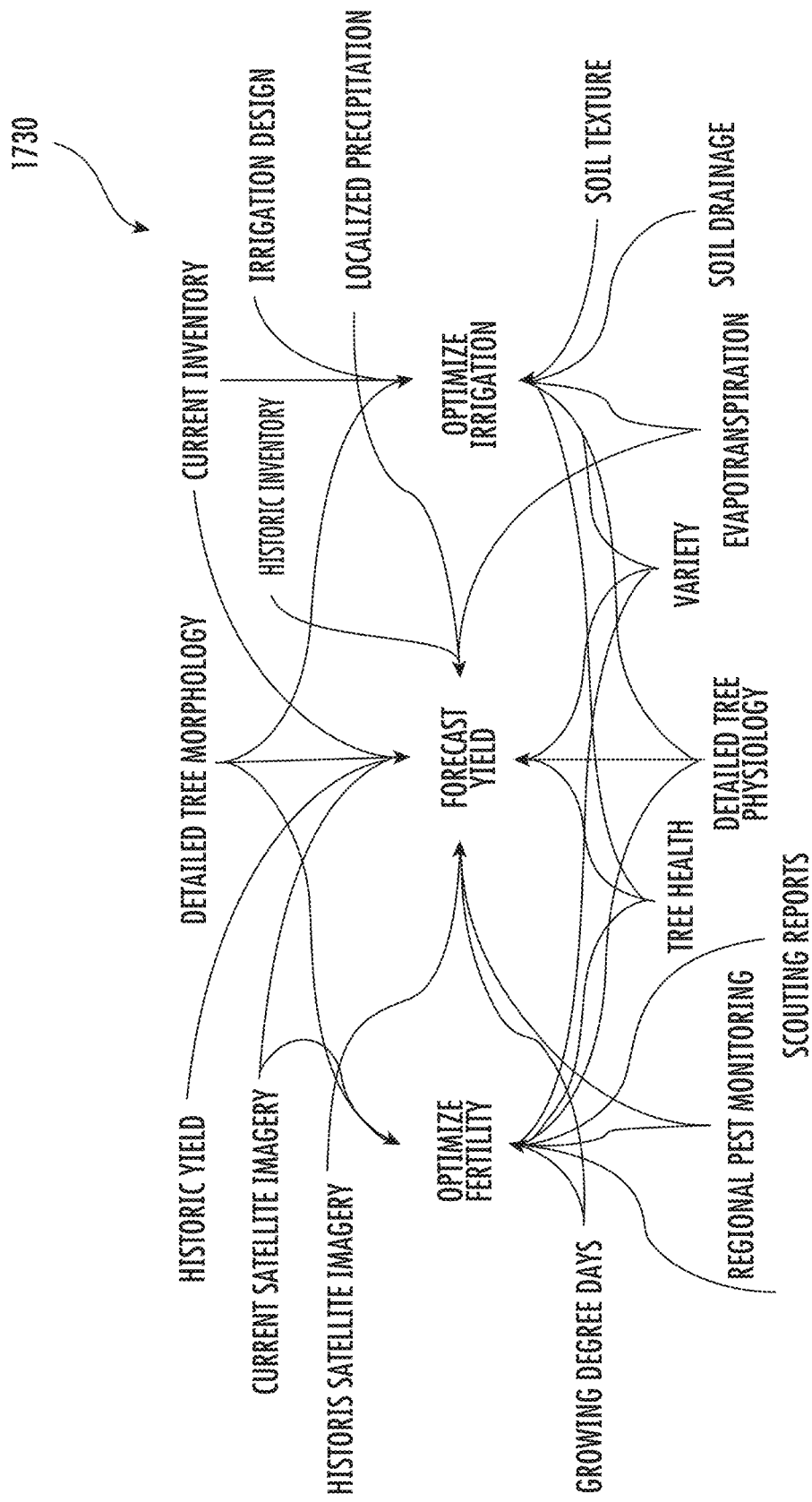

Referring now additionally to FIGS. 6B-6D, a diagram 1200 shows schematic diagrams of data flows and service components for the agricultural modeling system 200. The agricultural modeling system 200 illustratively includes a data analytics platform 236 outputting to precision agriculture solutions 230. The precision agriculture solutions 230, for example, provides the actionable insights derived from the agricultural modeling system 200, such as yield prediction, soil type by plant, relationships by variety, holistic operation view, carbon credits, treatment plan of native plants, and irrigation and water management. The agricultural modeling system 200 illustratively includes edge collection devices 233 with the inherited data sources 234, and third party data sources 235, all being ingested into the data analytics platform 236. The data analytics platform 236 cooperates with a public cloud platform 231, and/or a private cloud platform 232 for data storage and compute needs.

More specifically, the edge collection devices 233 illustratively include a grove tracker collection vehicle, a yield tracker collection vehicle, an aerial multi/hyper spectral drone, a greenhouse phenotyping scanner, and so on. The inherited data sources 234 may include a ground LiDAR dataset, an aerial LiDAR dataset, a GPS trajectory dataset, an aerial imagery dataset, a GeoJSON dataset, and a GeoTIFF dataset. The third party sources 235 may include a publicly or privately available satellite imagery dataset, a United States soil survey dataset, water table dataset, a weather dataset, and a climate dataset.

The data analytics platform 236 illustratively comprises a user interface outputting the precision agriculture solutions 230, and a developer interface receiving the materialized solution requirements. The data analytics platform 236 comprises an application catalog module, a data catalog and services module, a machine learning (ML) model registry module, and a container image registry module. The application catalog module includes a 3D Point cloud classification, mapping, reprojection, Digital Terrain Models (DTM)/Digital Elevation Models (DEM)/Digital Surface Models (DSM) generation, morphology explorer, georeferencing, orthoimage, and 3D model reconstruction. The data catalog and service module includes spatio-temporal NoSQL database, relational database management system (RDBMS), a workspace, an object store, and an external source integration. The ML model registry module includes deep forest data, and LiDAR trunk extraction. The container image registry module comprises a runtime module, a deep learning runtime module, and a Dask/Spark cluster runtime module.

The data analytics platform 236 illustratively comprises a workflow module, a cluster framework, a workflow scheduler, and an infrastructure DevOps module. The workflow module, for example, may include a series of computational pipelines to process the workloads of 3D point cloud classification, mapping, reprojection, DTM/DEM/DSM generation, morphology explorer, georeferencing, orthoimage, and 3D model reconstruction.

Diagram 1300 illustratively shows an exemplary data flow for a digital twins application of plant phenotyping study enabled by the agricultural modeling system 200. Diagram 1400 illustratively shows another exemplary data flow for a vitality tracker pipeline application driven by the agricultural modeling system 200. Of course, these applications are merely provided as a domain-specific case study and other applications are possible, such as a carbon credits application: for evaluation and calculations of carbon usage and associated credits via calculated biomass in combination; native plant monitoring: identification, measurement and logging of native tree health versus nearby grower crops using datasets in conjunction with local data (in addition impact of native trees on primary grower crop(s)); irrigation and water management: fusion of irrigation system layouts and IoT sensor data sources with processed data within the agricultural modeling system 200; and advanced yield prediction: combination of processed plant data, and actual yield data with ML/AI model to predict future yield within the agricultural modeling system.

Referring now additionally to FIGS. 7A-10, diagrams 1500 & 1600, 1700, 1710, 1720 respectively show relationships by variety, yield prediction, soil type-by-plant, and efficiency of irrigation system. Diagram 1730 is a holistic operation view of the data fusion, showing the sources for the predicted fertility, yield, and irrigation.

Diagrams 1500, 1600 show georeferenced current production inventory on a plant-by-plant basis. The agricultural modeling system 200 may determine historic changes in inventory, merge current and historic production data, and merge current field observations, soil moisture, and scouting reports. As shown in diagram 1700, the agricultural modeling system 200 may predict yield, and as shown in diagram 1720, assess impact of field conditions such as irrigation, variety, fertility on production. As shown in diagram 1710, the agricultural modeling system 200 may compare performance of blocks based on variety, soil type, field conditions, and pests.

In the following, an exemplary implementation of the agricultural modeling system 100, 200 is now described.
System Architecture
Analytics Environment The agricultural modeling system 100, 200 includes a cloud-agnostic containerized application platform in support of on-demand data analytics, ML and AI. The application stack is containerized to support execution on multiple IaaS providers and in the public cloud, the private cloud, the hybrid cloud, or the edge computing device configuration. This may comprise the integration of open source notebook runtimes such as Jupyter or Zeppelin notebook frameworks as part of its data analytics platform. The agricultural modeling system 100, 200 is configured for auto scaling to respond to data size, compute requirements and overall input/output needs "on the fly" and on a per user basis. This can be configured in a shared use model or an isolated instance (per client) model.

The agricultural modeling system 100, 200 is a large-scale geospatial data analysis, integration, and visualization platform that enables end users to upload their own or third party data source, analyze it alongside collaborators (i.e. plant scientists or team members in the same organization) with LiDAR-based precision point cloud dataset fused with other public data sources (e.g. aerial or satellite imagery, soil, water, and other climate datasets), build historically georectified and fused presentation through the layered data model, and share and publish reproducible analytics workflows and data artifacts.

The system design of agricultural modeling system 100, 200 is conducted by the cloud-agnostic principle with a scalable and immutable infrastructure, which enables transparently scaling user's applications and workloads across multiple IaaS providers with multiple deployment structures: the public cloud, the private cloud, the hybrid cloud, or the edge computing device.
Deployment Pattern The production deployment of the agricultural modeling system 100, 200 supports at least four different infrastructure types: 1) single server: a single computing server hosted on either on-premises or off-premises (edge) computing environment; 2) single cloud: a single computing cluster hosted on either a single public or private cloud environment; 3) multi-cloud: a group of computing clusters spun up on the infrastructures provided by multiple public cloud providers; or 4) hybrid: a combination of on-premises and public cloud computing environments. The last two deployment approaches (multi-cloud and hybrid) are used to improve the business and technical challenges inherited from the single cloud environment or region: networking; workload portability and autoscaling; data protection; monitoring and logging; and developer operations.
User Interface The agricultural modeling system 100, 200 permits users to execute analytics scripts, modify exposed parameters and add functionality to scripts to enhance the final output dataset. Also, bundled data, software code and user interfaces can be created and made available for use by other web enabled systems. The agricultural modeling system 100, 200 includes a custom code interface and integration, and an extensible programming interface. This supports the use of standard industry best practice analytics programming languages, such as Python, R, *Julia* programming language, etc. The agricultural modeling system 100, 200 also supports the use of custom analytics scripts and re-usable APIs and libraries.

The agricultural modeling system 100, 200 is capable of supporting the industry-standard notebook framework with multi-programming runtime support, which enables users to seamlessly add their own custom code (e.g. Python, R, *Julia*) and documentation (e.g. Markdown cells) into the existing workflows. Depending on the integration granularity, the code interaction and data exchange between the agricultural modeling system 100, 200 core APIs/workflow and users' custom code can be implemented through two different levels: cell-to-cell or notebook-to-notebook. The code or Markdown cell is a basic programming unit defined in the notebook development interface. The cell-level integration provides a fine-grained programming interaction between users' custom code and agricultural modeling system 100, 200 and enables users to further customize the standardized data processing workflow based-on their data processing logic. For example, users can leverage the flexibility of code cells to add, modify, or remove the selected analysis steps to fit their requirements. On the other hand, the notebook-level integration abstracts away the complexity of individual implementation of data processing workflow and allows a rapid assembly between user-defined and standardized workflows with a plug and play experience.
3rd Party Data Integration Data Domain In the agricultural modeling system 100, 200, data sources can include the post processed LiDAR data collection made available directly from internal databases and file stores. Datasets, analytics scripts and code can be bundled and encapsulated ensuring strict data privacy and isolation between clients and customers. The agricultural modeling system 100, 200 integrates directly into the internal ground/aerial LiDAR data sources, which provide its foundational layer zero geo-referenced dataset. Also, for data security, the integration into data sources is secure and encrypted with the managed encryption keys. This security can be maintained in both a single and multi-tenant configuration.

The agricultural modeling system 100, 200 can upload, use and leverage third party datasets to be fused with layer zero data. The third party data can be uploaded via a transactional fashion, a batch mechanism, or a direct database integration. The layered data model in the agricultural modeling system 100, 200 is a primary to support reproducibility, interactive nature, and collaboration across different data science teams or organizations. The agricultural modeling system 100, 200 is built upon the geo-rectified data model where each geospatial layer is automatically versioned and connected to its provenance information describing how it was generated. Each geospatial layer is also associated with the specific notebook-based workflow in which it was prepared or updated. The input and output data between upstream and downstream analysis steps are traced and versioned by data lineage that is guaranteed by the immutable data storage system fundamentally. When a data processing workflow is shared or copied, all its data dependencies such as layered input data sources, pipeline configurations, and other metadata information are replicated and versioned with it. With the same data dependencies and a workflow copy, users can reproduce an identical intermediate dataset from each data analysis step as well as the final output and report aggregated from all steps inside the whole analytics workflow. The default supporting data types include ground/aerial LiDAR data sources, aerial imagery data sources, and other industry standard geospatial formats such as GeoJSON, GeoTIFF, COG, GeoPackage and so on. The available data types can be easily extended to support a new analytics application or adapt a new data layer.

Other features relating to agricultural modeling are disclosed in co-pending applications: titled "Systems And Methods For Monitoring Agricultural Products," application Ser. No. 16/707,198; titled "Forestry Management Tool For Assessing Risk Of Catastrophic Tree Failure Due To Weather Events," application Ser. No. 16/603,159; and U.S. patents: titled "Systems And Methods For Determining Crop Yields With High Resolution Geo-Referenced Sensors," U.S. Pat. No. 10,534,086; titled "Systems And Methods For Determining Crop Yields With High Resolution Geo-Referenced Sensors," U.S. Pat. No. 10,539,545; titled "Systems And Methods For Monitoring Agricultural Products," U.S. Pat. No. 10,371,683; titled "Systems And Methods For Monitoring Agricultural Products," U.S. Pat. No. 9,939,417; titled "Systems And Methods For Monitoring Agricultural Products," U.S. Pat. No. 10,520,482; titled "Systems And Methods For Determining Crop Yields With High Resolution Geo-Referenced Sensors," U.S. Pat. No. 10,151,839; and titled "Systems And Methods For Determining Crop Yields With Lidar Sensors," U.S. Pat. No. 9,983,311, all incorporated herein by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An agricultural modeling system for processing data for an agricultural geographic area, the agricultural modeling system comprising:
   a mobile light detection and ranging (LiDAR) platform configured to generate three-dimensional (3D) point cloud data of the agricultural geographic area;
   a plurality of client devices;
   a geospatial database configured to store at least one data layer for the agricultural geographic area and having a resolution less than or equal to the 3D point cloud data of the agricultural geographic area; and
   a server computing resource in communication with said mobile LiDAR platform, said plurality of client devices, and said geospatial database, said server computing resource configured to
      scale each data layer with the 3D point cloud data of the agricultural geographic area,
      geographically reference the at least one data layer fused with the 3D point cloud data of the agricultural geographic area, and
      generate a multi-layered data model for the geographically referenced at least one data layer fused with the 3D point cloud data of the agricultural geographic area for providing interactive analysis and visualization of agricultural information alongside collaborators with LiDAR-based high resolution 3D plant model;
   a given client device from said plurality of client devices configured to
      upload an additional data source to said server computing resource, said server computing resource configured to geographically reference and fuse the additional data source and the 3D point cloud data of the agricultural geographic area, and
      selectively render the multi-layered data model including the additional data source, the multi-layered data model being unique to the given client device.

2. The agricultural modeling system of claim 1 wherein said at least one data layer for the agricultural geographic area comprises a plurality of data layers for the agricultural geographic area comprising a climate data source, a soil survey data source, a satellite imagery data source, and a tree phenotyping data source.

3. The agricultural modeling system of claim 1 wherein the 3D point cloud data comprises a Keyhole Markup Language polygon defining the agricultural geographic area.

4. The agricultural modeling system of claim 1 wherein said server computing resource and said given client device are configured to execute a programming code script; and wherein said given client device is configured to selectively render the multi-layered data model based upon the programming code script.

5. The agricultural modeling system of claim 4 wherein said server computing resource and said given client device are configured to execute the programming code script based upon a cell-to-cell basis.

6. The agricultural modeling system of claim 1 wherein said server computing resource is configured to generate a different multi-layered data model for each client device using a respective different at least one data layer.

7. The agricultural modeling system of claim 1 wherein said given client device comprises a notebook client device; and wherein said at least one data layer is associated with at least one notebook workflow.

8. The agricultural modeling system of claim 1 wherein said mobile LiDAR platform comprises at least one of an airborne platform and a ground platform.

9. A server computing resource in an agricultural modeling system for processing data for an agricultural geographic area, the agricultural modeling system comprising a mobile light detection and ranging (LiDAR) platform configured to generate three-dimensional (3D) point cloud data of the agricultural geographic area, a plurality of client devices, and a geospatial database configured to store at least one data layer for the agricultural geographic area and having a resolution less than or equal to the 3D point cloud data of the agricultural geographic area, the server computing resource comprising:
 a processing unit and storage device cooperating therewith and configured to
  receive the 3D point cloud data of the agricultural geographic area from the mobile LiDAR platform, and receive the at least one data layer for the agricultural geographic area from the geospatial database,
  scale each data layer with the 3D point cloud data of the agricultural geographic area,
  geographically reference the at least one data layer fused with the 3D point cloud data of the agricultural geographic area, and
  generate a multi-layered data model for the geographically referenced at least one data layer fused with the 3D point cloud data of the agricultural geographic area for providing interactive analysis and visualization of agricultural information alongside collaborators with LiDAR-based high resolution 3D plant model;
 a given client device from the plurality of client devices configured to
  upload an additional data source to said processing unit, said processing unit configured to geographically reference and fuse the additional data source and the 3D point cloud data of the agricultural geographic area, and
  selectively render the multi-layered data model including the additional data source, the multi-layered data model being unique to the given client device.

10. The server computing resource of claim 9 wherein said at least one data layer for the agricultural geographic area comprises a plurality of data layers for the agricultural geographic area comprising a climate data source, a soil survey data source, a satellite imagery data source, and a tree phenotyping data source.

11. The server computing resource of claim 9 wherein the 3D point cloud data comprises a Keyhole Markup Language polygon defining the agricultural geographic area.

12. The server computing resource of claim 9 wherein said processing unit is configured to execute a programming code script; and wherein the given client device is configured to selectively render the multi-layered data model based upon the programming code script.

13. The server computing resource of claim 12 wherein said processing unit is configured to execute the programming code script based upon a cell-to-cell basis.

14. The server computing resource of claim 9 wherein said processing unit is configured to generate a different multi-layered data model for each client device using a respective different at least one data layer.

15. A method for operating a server computing resource in an agricultural modeling system for processing data for an agricultural geographic area, the agricultural modeling system comprising a mobile light detection and ranging (LiDAR) platform configured to generate three-dimensional (3D) point cloud data of the agricultural geographic area, a plurality of client devices, and a geospatial database configured to store at least one data layer for the agricultural geographic area and having a resolution less than or equal to the 3D point cloud data of the agricultural geographic area, the method comprising:
 receiving the 3D point cloud data of the agricultural geographic area from the mobile LiDAR platform, and receiving the at least one data layer for the agricultural geographic area from the geospatial database;
 scaling each data layer with the 3D point cloud data of the agricultural geographic area;
 geographically referencing the at least one data layer fused with the 3D point cloud data of the agricultural geographic area; and
 generating a multi-layered data model for the geographically referenced at least one data layer fused with the 3D point cloud data of the agricultural geographic area for providing interactive analysis and visualization of agricultural information alongside collaborators with LiDAR-based high resolution 3D plant model;
 a given client device from the plurality of client devices configured to
  upload an additional data source to the server computing resource, the server computing resource configured to geographically reference and fuse the additional data source and the 3D point cloud data of the agricultural geographic area, and
  selectively render the multi-layered data model including the additional data source, the multi-layered data model being unique to the given client device.

16. The method of claim 15 wherein the at least one data layer for the agricultural geographic area comprises a plurality of data layers for the agricultural geographic area comprising a climate data source, a soil survey data source, a satellite imagery data source, and a tree phenotyping data source.

17. The method of claim 15 wherein the 3D point cloud data comprises a Keyhole Markup Language polygon defining the agricultural geographic area.

18. The method of claim 15 further comprising executing a programming code script; and wherein the given client device is configured to selectively render the multi-layered data model based upon the programming code script.

19. The method of claim 18 further comprising executing the programming code script based upon a cell-to-cell basis.

20. The method of claim 15 further comprising generating a different multi-layered data model for each client device using a respective different at least one data layer.

* * * * *